(12) United States Patent
Vaculik et al.

(10) Patent No.: US 11,926,085 B2
(45) Date of Patent: Mar. 12, 2024

(54) METHOD FOR CONTROLLING AN INJECTION MOLDING SYSTEM

(71) Applicant: Kistler Holding AG, Winterthur (CH)

(72) Inventors: Robert Vaculik, Constance (DE); Curtis Krick, Simpsonville, SC (US)

(73) Assignee: Kistler Holding AG, Winterthur (CH)

(*) Notice: Subject to any disclaimer, the term of this patent is extended or adjusted under 35 U.S.C. 154(b) by 0 days.

(21) Appl. No.: 17/271,251

(22) PCT Filed: Oct. 1, 2019

(86) PCT No.: PCT/EP2019/076636
§ 371 (c)(1),
(2) Date: Feb. 25, 2021

(87) PCT Pub. No.: WO2020/070155
PCT Pub. Date: Apr. 9, 2020

(65) Prior Publication Data
US 2021/0339447 A1 Nov. 4, 2021

Related U.S. Application Data

(60) Provisional application No. 62/741,676, filed on Oct. 5, 2018.

(30) Foreign Application Priority Data

Oct. 17, 2018 (EP) .................... 18200884

(51) Int. Cl.
*B29C 45/77* (2006.01)
*B29C 45/26* (2006.01)
*B29C 45/78* (2006.01)

(52) U.S. Cl.
CPC .............. *B29C 45/77* (2013.01); *B29C 45/26* (2013.01); *B29C 45/78* (2013.01);
(Continued)

(58) Field of Classification Search
CPC ......... B29C 45/77; B29C 45/26; B29C 45/78; B29C 2045/2683; B29C 2945/76006;
(Continued)

(56) References Cited

U.S. PATENT DOCUMENTS

| 5,518,389 A | 5/1996 | Nonomura et al. |
| 6,090,318 A | 7/2000 | Bader et al. |

(Continued)

FOREIGN PATENT DOCUMENTS

| CN | 103112138 | * 4/2015 | ............ B29C 45/76 |
| EP | 2583811 A1 | 4/2013 | |

(Continued)

OTHER PUBLICATIONS

International Search Report English Translation, dated Dec. 9, 2019, 6 pages.
Written Opinion of Searching Authority Translation, dated Dec. 9, 2019, 6 pages.
Japanese Office Action with Translation, dated Feb. 25, 2022, 6 pages.

*Primary Examiner* — Galen H Hauth
*Assistant Examiner* — Shibin Liang
(74) *Attorney, Agent, or Firm* — Dority & Manning, P.A.

(57) ABSTRACT

A method is provided for controlling an injection molding system, which includes a mold having an inner surface defining at least two groups of cavities, each group of cavities defining precisely one cavity with one pressure sensor at the inner surface. Each group of cavities is at least partially surrounded by a tempering unit that provides an energy flow to the surrounded cavities. According to the method, a pressure is determined in each group of cavities of the at least two groups of cavities. A reference pressure is determined for each group of cavities. A difference between the reference pressure and the pressure in at least one group of cavities is determined and controlled to become minimum by manipulating the energy flow of the tempering unit.

15 Claims, 2 Drawing Sheets

(52) U.S. Cl.
CPC ............. *B29C 2045/2683* (2013.01); *B29C 2945/76006* (2013.01); *B29C 2945/7604* (2013.01); *B29C 2945/76257* (2013.01); *B29C 2945/76498* (2013.01); *B29C 2945/76943* (2013.01); *B29C 2945/76969* (2013.01)

(58) Field of Classification Search
CPC .. B29C 2945/7604; B29C 2945/76257; B29C 2945/76498; B29C 2945/76943; B29C 2945/76969; B29C 45/47; B29C 45/73; B29C 45/76; B29C 49/00; B29C 49/42; B29C 49/06

See application file for complete search history.

(56) References Cited

U.S. PATENT DOCUMENTS

2004/0131715 A1* 7/2004 Frey ................. B29C 45/76
                                                                        425/143
2017/0157823 A1* 6/2017 Takehana ............ B29C 45/73

FOREIGN PATENT DOCUMENTS

| | | |
|---|---|---|
| JP | H-07-001534 A | 1/1995 |
| JP | H-11-291300 A | 10/1999 |

* cited by examiner

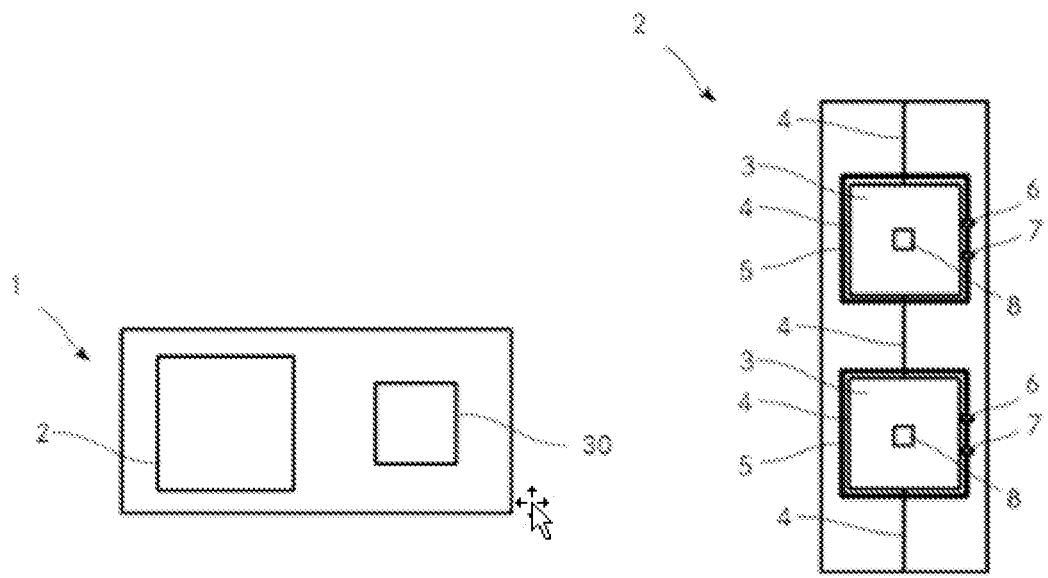
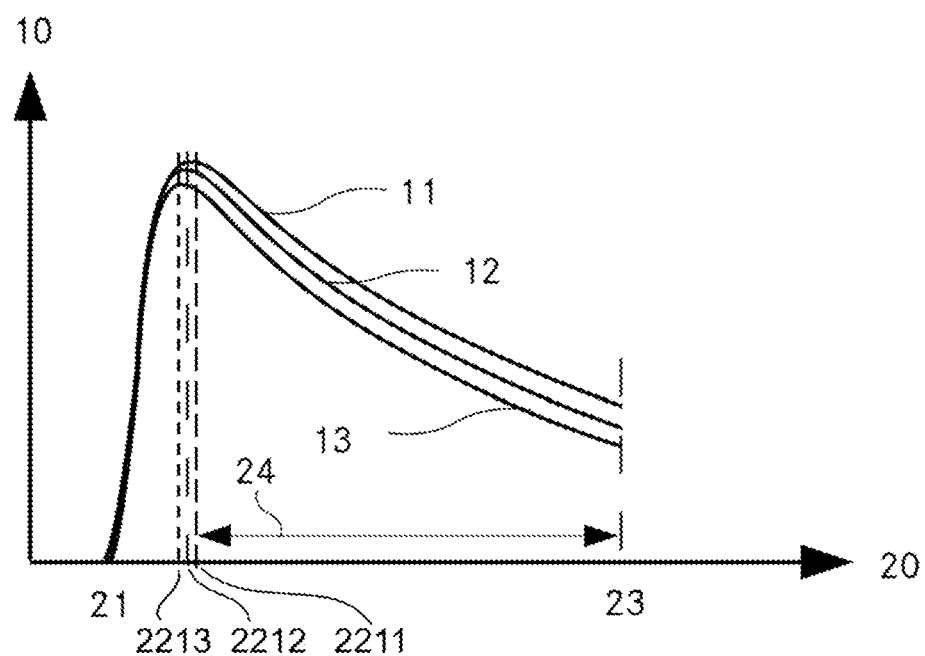
Fig. 3 PRIOR ART

METHOD FOR CONTROLLING AN INJECTION MOLDING SYSTEM

CROSS-REFERENCE TO RELATED APPLICATIONS

The present application claims priority to patent application serial number PCT/EP2019/076636, filed on Oct. 1, 2019, which patent application is hereby incorporated herein in its entirety by this reference for all purposes.

FIELD OF THE INVENTION

The invention relates to a method for controlling an injection molding system with a mold having an inner surface and at least two groups of cavities, each cavity being confined by the inner surface. The group of cavities further has precisely one pressure sensor being arranged at the inner surface in an area of each group of cavities. Each group of cavities is at least partially surrounded by a tempering unit. According to the method, a pressure in at least one cavity of each group of cavities of the at least two groups of cavities is determined, a reference pressure for each group of cavities is determined, a difference between the reference pressure and the pressure in at least one group of cavities is determined, and the difference is controlled to become minimum. The invention further relates to a controller for performing the method according to the invention. The invention also relates to a use of the controller according to the invention. The invention further relates to an injection molding system comprising a controller according to the invention.

BACKGROUND OF THE INVENTION

Conventional injection molding systems frequently comprise a mold with a plurality of cavities to produce a plurality of articles simultaneously. To do so, molten material, often referred to as resin, is loaded into a tubular passage called a runner. Usually, the runners are tempered to maintain the material therein in a processible form. The processible material flows from the runner through a gate valve, also called a nozzle, into the cavities of the mold. A material is processible, if the form of the material allows it to be flowed through from the runner through the gate vale into the cavity of the mold. Depending on the material, temperature ranges of the tempered runner differ. The material in the cavities is then tempered and hardens into articles. In case of thermoplastics, tempering of the material in the cavities refers to cooling of the molten plastic and in case of rubber or thermosetting material being cured by heat, tempering refers to heating of the material in the cavities. The mold is opened and the articles are ejected. A particular challenge of such injection molding systems having multiple cavities is to produce articles of uniform outer and inner condition in each of the multiple cavities of a mold. Outer and inner condition refers for example to size, weight, density, density distribution, and other conditions or properties of the articles.

U.S. Pat. No. 5,518,389, which is hereby incorporated herein by this reference in its entirety for all purposes, discloses a multi-cavity mold with independently controlled heated runners to make the amount of resin charged into the cavities uniform from one cavity to the next. The weight of each molded article is compared to an average weight of the molded articles. The difference is used to adjust the temperature of the heated runners. If, for example, the weight of a molded article is lower than the average weight of the molded articles, the temperature of the corresponding heated runner is increased to allow for more resin to flow into the corresponding cavity of the multi-cavity mold. However, as the weight of the articles cannot be measured while the article is being molded, but rather after the article has been molded, the process for adjusting the temperatures in the heated runners requires several molding cycles and does not prevent from the production of articles being out of the weight tolerance. It is also suggested to provide a control unit for controlling the circulation and the temperature of the coolant which flows through the mold, i.e. to set and control the temperature and flow rate of the coolant.

U.S. Pat. No. 6,090,318, which is hereby incorporated herein by this reference in its entirety for all purposes, discloses a process for controlling the hot-runner heating of a multi-cavity injection mold. To obtain simultaneous filling of all cavities, the pressure patterns in all cavities are detected as well as the time duration from the beginning of filling until a chosen reference pressure is reached for each cavity. The temperatures of the individual heating systems of the individual hot runners are controlled to bring the time durations of the individual cavities more in line. A simple though time-consuming control of the mold filling can be achieved by lowering the hot-runner temperatures of the cavities filled first, i.e. being first in their pressure patterns, and/or raising the hot-runner temperature of those cavities filled last. To reduce errors, the pressure-time integral determined for each cavity can be taken into account for controlling the hot-runner temperatures. A further optimization includes detecting the maximum pressure in each cavity in addition, and taking this into account in the hot-runner temperature control. To achieve a fast filling of all cavities, the mean values of above mentioned time durations, integrals and maximum values are determined, and the difference thereof to the continuously measured values is controlled to become minimum. The ultimate effect of the disclosed process is to bring the filling times of the individual cavities very close together, so that the pressure patterns for several cavities are virtually congruent. However, this kind of control does not ensure all pressure patterns to be congruent. To overcome this issue, the application of fuzzy logic methods is suggested.

However, the uniformity of articles produced using above mentioned devices and processes still is not always satisfying.

OBJECTS AND SUMMARY OF THE INVENTION

It is an object of the invention to create a method pertaining to the technical field initially mentioned that allows for an improved uniformity of the articles produced thereby. It is also an object of the invention to create a controller for performing the method according to the invention.

The solution of the invention is specified by the features described below. According to the invention, the method for controlling an injection molding system comprises several steps. The injection molding system comprises a mold having an inner surface and at least two groups of cavities being confined by the inner surface. A group of cavities comprises at least one cavity. The group of cavities further has precisely one pressure sensor being arranged at the inner surface in an area of a cavity of each group of cavities. The pressure sensor determines the pressure for the group of cavities. Each group of cavities is at least partially surrounded by the tempering unit. The method comprises the steps of:

a) determining a pressure in a cavity of each group of cavities of the at least two groups of cavities,
b) determining a reference pressure for each group of cavities,
c) determining a difference between the reference pressure and the pressure in at least one cavity, and
d) controlling the difference to become minimum by
e) regulating an energy flow of a tempering unit.

It has turned out that the method according to the invention provides excellent balancing of the shrinking of a plurality of articles produced simultaneously with the injection molding system. As a consequence, the uniformity of the articles produced simultaneously is improved. In particular, the method according to the invention allows for a compensation of disturbances related to each group of cavities.

The mold of the injection molding system can consist of two halves. When the mold is closed, that is to say the two halves are arranged together, the inner surface of the mold confines at least two groups of cavities, each comprising at least one cavity. For a group of cavities comprising of more than one cavity, the cavities are identical in shape and size. The number of cavities comprised in a group of cavities may not always be evenly distributed. For example, one group of cavities of the at least two groups of cavities can comprise a first number of cavities, while another group of cavities of the at least two groups of cavities can comprise a number of cavities different from the first number of cavities.

The cavities of the at least two groups of cavities have an identical shape and size. The cavities of the at least two groups of cavities are separated from each other. However, the cavities of the at least two groups of cavities are connected with runners which allow each cavity to be supplied with a processible material. A runner serves as a transportation channel from a material source to a cavity. A cavity serves as a form for an article to be produced. Therefore, a cavity is different from a runner. The material can be pressed into each cavity for simultaneously forming an article in each cavity. The expression "pressed into each cavity" has in particular the meaning of "applied under pressure into each cavity" or "injected under pressure into each cavity". If the mold has at least two groups of cavities, each group of cavities comprising at least one cavity, at least two articles can be formed simultaneously having identical shapes and sizes. However, the mold can preferably have a number of cavities. For example, the mold can have two, three, four, ten, twenty, fifty, or any other natural number of cavities. In this case, it is possible to produce two, three, four, ten, twenty, fifty, or any other natural number of articles simultaneously. When the mold is opened, all of the just formed articles can be ejected. As already mentioned, it has turned out, that the uniformity of all of said just formed articles is improved compared to the prior art. Deviations from uniformity of the outer and inner condition, for example deviations on size, weight, density, density distribution, and other conditions or properties of the articles are minimized.

Precisely one pressure sensor is associated with each group of cavities of the at least two groups of cavities for determining a pressure in a cavity of the group of cavities. This pressure determined in a cavity of the group of cavities is referred to as the "pressure of the group of cavities". It is known that articles produced by some cavities of the mold show a satisfactory uniformity in the articles produced. If cavities showing a satisfactory uniformity in the articles produced are identified, these cavities may be grouped into a group of cavities. For this group of cavities one pressure is measured by precisely one pressure sensor being arranged in any of the cavities of the group of cavities. Thus, the number of pressure sensors needed for a given mold can be less than the number of cavities of the mold, rendering the grouping of cavities into a group of cavities cost efficient while maintaining a satisfactory uniformity in the articles produced. The expression "satisfactory" depends on the requirements of the articles and may be different for each application of an article. The pressure in each group of cavities is therefore determined individually. If there is at least one pressure sensor associated with each group of cavities of the at least two groups of cavities, the mold in total comprises at least two pressure sensors. Each pressure sensor is arranged at the inner surface in an area of a cavity of each group of cavities, that is to say where the inner surface is confining a cavity.

In one embodiment, a pressure sensor can be placed in a borehole which extends from each cavity to an outer surface of the mold. Each borehole is separate from the other boreholes. In another embodiment, a pressure sensor comprises a force sensor and an ejection pin used to eject an article from a cavity when the mold is open. An ejection pin extends from each cavity to an actuator arranged at an outer surface of the mold. The force sensor is arranges between actuator and ejection pin. The material inside the cavity presses the material against the ejection pin. Thus the pressure inside the cavity is measured. In another embodiment the pressure sensor is a strain gauge located close to the cavity in a borehole extending almost up to the cavity. The material inside the cavity presses against the inner walls of the mold in the area of the cavity, resulting in a strain of the borehole proportional to the pressure in the cavity. Thus the pressure inside the cavity is measured by the strain gage.

The expression "determining" has in particular the meaning of "measuring", "sensing" or "calculating". The expression "determining a pressure" has in particular the meaning of "measuring or sensing a pressure", that is to say measuring or sensing a pressure at a predetermined time, at predetermined times, or over a period of time to measure or sense a pressure pattern.

Each group of cavities is at least partially surrounded by a tempering unit for tempering the inner surface in cavities of each group of cavities. Tempering of the inner surface in cavities of each group of cavities is performed by regulating an energy flow within the tempering unit. The expression "energy flow" has in particular the meaning of "transferring energy from one position in space to another position in space". An energy flowing from one position in space to another position in space is for example heat energy transferred to the inner surface in cavities of each group of cavities, commonly referred to as "heating", or heat energy transferred away from the inner surface in cavities of each group of cavities, commonly referred to as "cooling". This allows for tempering the inner surfaces of cavities in each group of cavities individually. As there is one tempering unit associated with each group of cavities of the at least two groups of cavities, the mold in total comprises at least two tempering units. Each group of cavities can be completely surrounded by a tempering unit, or at least essentially completely, that is to say without that the tempering unit interferes with a runner or runners. Each tempering unit is arranged to provide a tempering power. The expression "tempering power" is a measure for the physical heat energy transferred to or from one position in space to another position in space per time unit. The expression "tempering" has in particular the meaning of "cooling and/or heating".

The expression "controlling" has in particular the meaning of "applying a control function" in a feedback loop, as for example a proportional-integral-derivative (PID) function, a feed-forward function, and/or combinations thereof.

The expression "controlling the difference to become minimum" has in particular the meaning of "controlling the difference to become essentially zero", or in other words, an "ideal" controlling of the difference would lead to a zero difference, however, a real controlling of the difference might lead to values slightly different from zero, that is to say minimum.

The expression "reference pressure" has in particular the meaning of "setpoint pressure", that is to say the setpoint pressure is the input of a pressure control function, or to be more precise, the input of a subtracter being ahead of the control function.

The pressure in a cavity of a group of cavities corresponds with the pressure of the material in the cavity, if a material is present.

In the special case of a mold with exactly two groups of cavities, it is possible to use the measured pressure in a cavity of a first group of cavities of the two groups of cavities as a reference pressure for a second group of cavities of the two groups of cavities. Thereby, the difference between the reference pressure and the actual pressure in the first group of cavities is always zero, even without being controlled to become minimum. In this special case it is only necessary to determine a difference between the reference pressure and the pressure in the second group of cavities and to control said difference to become minimum. In other words, the pressure in the second group of cavities is following the pressure in the first group of cavities.

In the case of a mold with for example more than two groups of cavities, the pressures of all groups of cavities except for the pressure in the first group of cavity can follow the pressure in the first group of cavities. In this context, step c) of "determining a difference between the reference pressure and the pressure in at least one group of cavities" can in particular have the meaning of "determining the differences between the reference pressure and the pressure of all groups of cavities except for the first group of cavities" (whereby the first group of cavities serves as the reference group of cavities, that is to say as the group of cavities with the pressure of which serves as a reference pressure for the other group of cavities).

According to a preferred embodiment of the invention, the step c) of "determining a difference between the reference pressure and the pressure in at least one group of cavities" includes the step of "determining a difference between the reference pressure and the pressure in each group of cavities," and wherein step d) and e) of "controlling the difference to become minimum by regulating an energy flow of the tempering unit" includes the step of "controlling each difference to become minimum by regulating an energy flow of each tempering unit".

This allows for a reference pressure which may be different from any of the pressures in the groups of cavities. The method according to the invention ensures that in this case the pressures in all groups of cavities will follow said reference pressure.

According to another preferred embodiment of the invention, step d) of "controlling the difference to become minimum" includes the step of "controlling the difference to become minimum at a predetermined time".

The predetermined time can be any time during the injection molding process which is representative for a shrinking of an article produced thereby. For example, the predetermined time can be the time at the end of a tempering phase of the mold, before the article is ejected from the mold.

However, the predetermined time can be also any other time, preferably any time while the pressure in a group of cavities is declining.

It is also possible to control the difference to become minimum at several predetermined times, for example at several predetermined times while the pressure in the group of cavities is declining.

According to another preferred embodiment of the invention, step d) of "controlling the difference to become minimum" includes the step of "controlling the difference to become minimum over a predetermined period of time".

Thereby, the balancing of the shrinking of the articles produced simultaneously can be further improved.

During the predetermined period of time, all steps a) to e) of the method according to the invention might be performed several times. In other words, the control feedback loop might have a faster frequency than the frequency of the pressure difference to be controlled.

Alternatively, as mentioned above, controlling the difference of pressures of groups of cavities to become minimum can be performed at a predetermined time, only.

According to another preferred embodiment of the invention, step b) of "determining a reference pressure for each group of cavities" includes the step of "determining a reference pressure by averaging the pressures of each group of cavity".

A reference pressure determined, that is to say calculated, in this way allows for smaller differences between the pressure in each group of cavities and the reference pressure, consequently leading to less effort regarding controlling the difference to become minimum and, therefore, achieving a very reliable method for controlling an injection molding system.

Alternatively, the reference pressure can be determined by calculating a root mean square (RMS) value of the pressures in each group of cavities.

According to another preferred embodiment of the invention, the method further comprises a step f) of "storing the reference pressure in a memory".

This allows for determining the reference pressure once and then storing the reference pressure in a memory to make the reference pressure available for future control loops without the need for re-determining the reference pressure again every time a control loop is performed. Also, for example after a switch-off of the injection molding system, the method according to the invention allows for a reasonable reference pressure to be available at the very beginning of a production process, before a reference pressure determined otherwise might be available.

The memory can be a random access memory (RAM) and/or a memory, for example an EEPROM (electrically erasable programmable read-only memory), which can store the reference pressure even when being switched off.

According to another preferred embodiment of the invention, step e) of "performing the controlling of the difference to become minimum by regulating an energy flow of the tempering unit" includes the step of "regulating a tempering energy flow of the tempering unit".

It has turned out that the method according to the invention works well in particular during a period of time when the inner surface of the mold is tempered by the tempering units. Depending on the material used to form an article, "tempered" can have the meaning of "heated" or "cooled".

However, the method according to the invention can also be performed during any other period of time, for example, when the inner surface of the mold is not tempered by the tempering units, or even when the inner surface of the mold is tempered by the tempering units.

According to another preferred embodiment of the invention, step e) of "performing the controlling of the difference to become minimum by regulating an energy flow of the tempering unit" includes the step of "regulating a flow of a tempering medium through the tempering unit".

A tempering medium, as for example a liquid, is a very efficient and effective means to provide an energy flow. The tempering medium can be circulating in the tempering unit. The tempering medium can be pre-tempered (pre-heated or pre-cooled) and/or stored so that an energy flow might be instantly available. Also, temporally fast changes of the energy flows are possible, resulting in a temporally fast change of the tempering temperature. Such a temporally fast change can be for example a temporally fast change from heating to cooling, or for example from moderate cooling to extreme cooling. The expression "temporally fast" is depending on the dimensions and physical properties of elements of the tempering unit the tempering medium is circulated in as well as dimensions and physical properties of the mold and refers to a time unit between a few milliseconds to several minutes.

Alternatively or in addition, electrical heating and/or thermoelectric cooling can be used. A tempering unit can comprise a thermoelectric cooling, for example by a Peltier heat pump. In addition or as an alternative, the tempering unit can comprise for example an electrical heater to provide a heating power.

According to another preferred embodiment of the invention, step e) of "performing the controlling of the difference to become minimum by regulating an energy flow of the tempering unit" includes the step of "regulating a valve of the tempering unit".

A valve is a very efficient and effective means to regulate a flow rate of a tempering medium.

Preferably, the valve is a servo valve. A servo valve allows for a direct connection to an output signal of a controller. A servo valve is electrically controllable. Preferably, the valve is arranged outside the mold and/or adjacent to a controller.

Alternatively or in addition to the valve, a pump can be used to manipulate regulate a flow rate of the tempering medium.

According to another preferred embodiment of the invention, the method further comprises a step g) of "determining a temperature of a material in a cavity of each group of cavities or of the tempering medium of the tempering unit of a group of cavities or of the inner surface of a cavity of the at least two group of cavities".

Determining a temperature of a material in a cavity of each group of cavities or of the tempering medium of the tempering unit of a cavity of each group of cavities or of the inner surface of a cavity of the at least two groups of cavities allows for a feed-forward controlling. As the temperature of the inner surface has a significant influence on the shrinking of the articles, said temperature can be used as a feed-forward function as to support the quality of the pressure control.

Determining said temperature has also the advantage that a cascade controlling is possible. Cascade controlling means that there are two controllings (controllers or control functions), for example two PID controllings, arranged with one controller controlling the setpoint of the other. For example, the pressure controller for regulating a tempering unit acts as an outer loop controller, which controls the pressure in the cavity. The other controller, for example a temperature controller or a flow rate controller, acts as inner loop controller, which reads the output of the outer loop controller as setpoint and provides as an output a signal for regulating a tempering unit, and in particular for regulating a flow rate of a tempering medium in a tempering unit.

It has turned out that the working frequency of the control function or the controller is increased and the time constant of the object to be controlled is reduced by using cascaded PID controllers.

Determining said temperature has also the advantage that an inlet temperature of a tempering medium can be controlled.

In a preferred embodiment, the tempering units are operated in a temperature range of 0° C. to 472° C.

According to another aspect of the invention, a controller for performing the method according to the invention comprises:
  a) an input for receiving a pressure of a cavity of each group of cavities of at least two cavities of a mold of an injection molding system, each group of cavities comprising of at least one cavity,
  b) an input and/or a calculator for receiving and/or calculating, respectively, a reference pressure for each group of cavities,
  c) a subtracter for calculating a difference between the reference pressure and the pressure in at least one group of cavities,
  d) a control function for controlling the difference to become minimum, and
  e) an output for regulating an energy flow of a tempering unit.

Such a controller is well suited for performing the method according to the invention. The controller can be implemented as a conventional analog controller, and/or the controller can be implemented as a digital controller comprising a microcontroller, a microprocessor and/or a digital signal processor. In the latter case, the controller further might comprise software. In particular, the control function of the controller can be implemented in form of a software which can be stored and/or executed in a memory of the microcontroller, the microprocessor and/or the digital signal processor.

In particular, a digital controller allows for an easy and simple retrofit of existing injection molding systems. Essentially, an exchange or update of the control function for controlling the difference to become minimum is required, that is to say a software update is required, if the needed hardware is already existing. The needed hardware includes a mold with at least two groups of cavities as well as pressure sensors and tempering units as explained above.

Therefore, according to another aspect of the invention, a control function is adapted to control the difference between the reference pressure and the pressure in a group of cavities to become minimum by regulating an energy flow of a tempering unit.

Preferably, the controller is arranged inside the injection molding system and outside the mold.

The controller is adapted to perform all the steps of the method according to the invention, or a part of the steps, in any combination and in any particular sequence.

According to another aspect of the invention, the controller according to the invention is used in an injection molding system.

According to another aspect of the invention, an injection molding system comprises a controller according to the invention and a mold which has:
a) an inner surface,
b) at least two groups of cavities, each being confined by the inner surface, each group of cavities comprising at least one cavity,
c) at least one pressure sensor being arranged at the inner surface in an area of each group of cavities,
d) at least two tempering units, wherein each group of cavities is at least partly partially surrounded by one tempering unit, and wherein each tempering unit is arranged to provide a tempering power.

Other advantageous embodiments and combinations of features come out from the detailed description below and the entirety of the claims.

BRIEF DESCRIPTION OF THE DRAWINGS

The drawings used to explain the embodiments show:
FIG. 1 an injection molding system,
FIG. 2 a mold with two groups of cavities, pressure sensors and tempering units,
FIG. 3 a typical pressure distribution for different groups of cavities of a mold over the time according to the prior art,
FIG. 4 a method for controlling the pressures in the different groups of cavities of a mold according to the invention,
FIG. 5 a pressure distribution for different cavities of a mold over the time according the invention.

In the figures, the same components are given the same reference symbols.

DETAILED DESCRIPTION OF EXEMPLARY EMBODIMENTS

Figure 4:
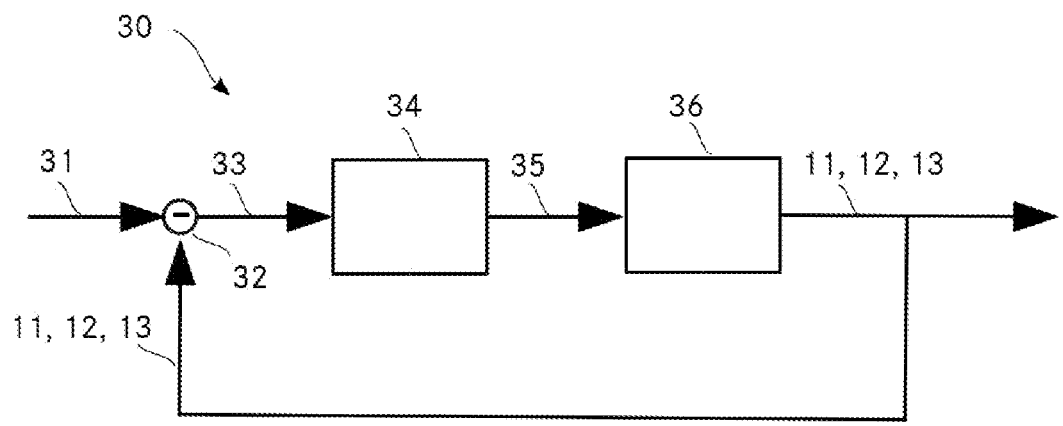

FIG. 1 shows an injection molding system 1 comprising a mold 2 and a controller 30. The controller 30 controls the injection molding system 1 and is arranged outside the mold 2.

FIG. 2 shows a mold 2 in a closed configuration. The mold may comprise two halves which are arranged together at an inner surface 4 of the mold 2. The inner surface 4 confines two groups of cavities 3, each comprising at least one cavity 8, which cavities 8 are separated and spaced from each other. Each group of cavities 3 is surrounded by a tempering unit 5 for individually tempering the group of cavities 3 with its respective cavities 8. At the inner surface 4 in an area of each group of cavities 3, or in other words at the inner surface 4 of one cavity 8 of each group of cavities 3, a pressure sensor 6 and an optional temperature sensor 7 are arranged for measuring the pressure and the temperature of a material in each group of cavities 3, respectively. A processible material can be pressed via runners (not shown) and nozzles (not shown) into each cavity 8 of each group of cavities 3 to form at least two articles (not shown) simultaneously. In an open configuration of the mold 2 (not shown), the two halves of the mold 2 are separated from each other for ejecting the two articles.

FIG. 3 shows a typical pressure 10 distribution for different groups of cavities 3 of a mold 2 over the time 20 during a conventional injection molding process according to the prior art. A pressure 11 of a first group of cavities of the mold 2, a pressure 12 of a second group of cavities of the same mold 2, and a pressure 13 of a third group of cavities of the same mold 2 start to rise at the same initial rising time 21, when material is being pressed into a cavity that includes the pressure sensor of each group of cavities. However, each of pressures 11, 12, 13 reaches its peak value at slightly different peak times 22. Also, at the predefined time 23, the pressures 11, 12, 13 have different values.

FIG. 4 schematically shows a method for controlling the pressures 11, 12, 13 in the different groups of cavities 3 of the mold 2, and an implementation of the method in the form of a controller 30. From a reference pressure 31, the actually measured pressures 11, 12, 13 are subtracted by subtracter 32 to determine a difference pressure 33 between the actually measured pressures 11, 12, 13 and the reference pressure 31. It is possible to have a bundle of difference pressures 33, that is to say one difference pressure 33 for each measured pressure 11, 12, 13. Difference pressure 33 is the input of the control function 34 like for example a PID function. Control function 34 outputs an intended flow rate 35 of a tempering medium. The intended flow rate 35 forms an input of valve 36 which is adapted to establish an actual flow rate of the tempering medium corresponding to the outputted intended flow rate 35. A pressure sensor (not shown in FIG. 4, but shown in FIG. 2) arranged in a cavity 8 of each of the group of cavities (not shown in FIG. 4, but shown in FIG. 2) measures the actual pressures 11, 12, 13 in each group of cavities. Said actually measured pressures 11, 12, 13 are, as already mentioned, an input of subtracter 32.

Figure 5:
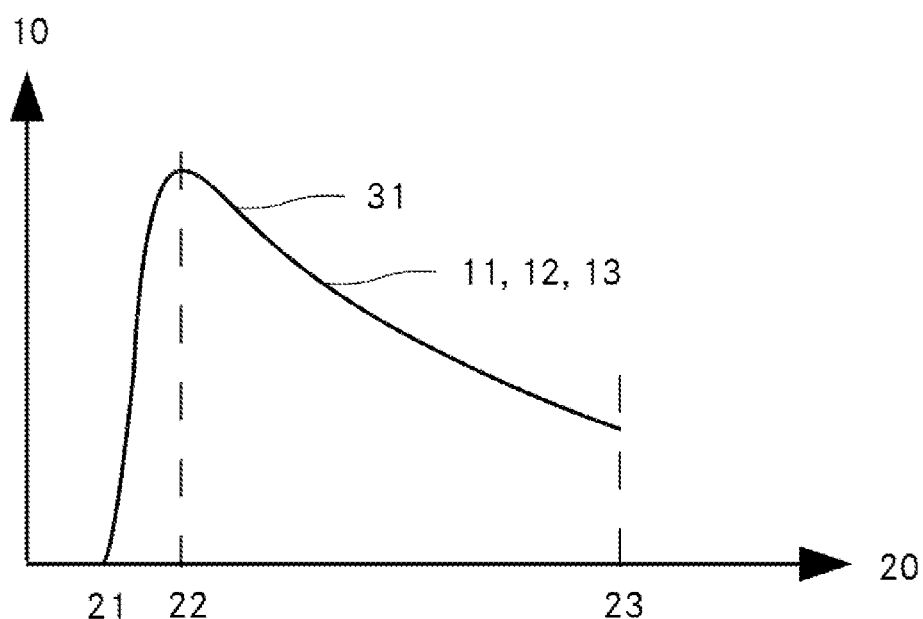

FIG. 5 shows a pressure 11, 12, 13 distribution for different groups of cavities 3 (not shown) over the time 20 according to the invention. As the difference pressure 33 (see FIG. 4) is controlled to become minimum, the pattern of the reference pressure 31 and the patterns of the measured pressures 11, 12, 13 are essentially identical.

In summary, it is to be noted that the different aspects of the invention and the different embodiments thereof solve the object of the invention well.

LIST OF REFERENCE SYMBOLS 1 injection molding system
2 mold
3 group of cavities
4 inner surface
5 tempering unit
6 pressure sensor
7 temperature sensor
8 cavity
1 pressure
11 pressure in a first cavity
12 pressure in a second cavity
13 pressure in a third cavity
20 time
21 initial rising time
22 peak time
23 predetermined time
24 predefined period of time
30 controller
31 reference pressure
32 subtracter
33 difference
34 control function
35 flow rate of a tempering medium
36 valve

The invention claimed is:
1. A method for controlling an injection molding system during formation of articles with a mold having an inner surface and a plurality of groups of cavities that includes a first group of cavities and a second group of cavities, each group of cavities comprising at least one cavity confined by the inner surface, and each respective group of cavities further having a respective pressure sensor disposed at the inner surface in a region of a cavity of each respective group of cavities, and each respective group of cavities being at least partially surrounded by a respective tempering unit that includes a tempering medium that provides an energy flow to or from the respective at least partially surrounded group of cavities, the method being performed during the formation of the articles in the mold and comprising the steps of:

a) determining an actual pressure in each of the first group of cavities and the second group of cavities during the formation of the articles in the mold, b) using the actual pressures in step a) in determining a reference pressure as a function of the actual pressures in step a) during the formation of the articles in the mold for each of the first group of cavities and the second group of cavities, wherein step b) includes determining a reference pressure by averaging the pressures of each group of cavities, c) determining a difference between the reference pressure and the actual pressure of the first group of cavities, and d) controlling the difference to become minimum that is essentially zero within the constraints of the accuracy of the respective pressure sensor, wherein step d) is performed by regulating the energy flow of the respective tempering unit.

2. The method according to claim 1, wherein step c) includes determining a difference between the reference pressure and the pressure of each group of at least two groups of cavities, and wherein step d) includes controlling each difference of each group of at least two groups of cavities to become minimum, and wherein step e) is performed by regulating the energy flow of each tempering unit of each group of at least two groups of cavities.

3. The method according to claim 1, wherein step d) includes controlling the difference to become minimum at a predetermined time.

4. The method according to claim 1, wherein step d) includes controlling the difference to become minimum over a predetermined period of time.

5. The method according to claim 1, further comprising the step:
f) Storing the reference pressure in a memory.

6. The method according to claim 1, wherein step e) includes regulating a tempering energy flow of the tempering unit.

7. The method according to claim 1, wherein step e) includes regulating a flow rate of a tempering medium through the tempering unit.

8. The method according to claim 7, wherein step e) includes regulating a valve of the tempering unit.

9. The method according to claim 1, further comprising the step:
f) Determining temperature of a material in a cavity of each group of cavities.

10. The method according to claim 1, further comprising the step:

f) Determining temperature of the tempering medium of the tempering unit of a group of cavities.

11. The method according to claim 1, further comprising the step:
f) Determining temperature of the inner surface of a group of cavities of the at least two groups of cavities.

12. The method according to claim 1, wherein the reference pressure determined in step b) is selected as the pressure in one of the first group of cavities and the second group of cavities.

13. The method according to claim 1, wherein the reference pressure in step b) is determined while material is being pressed into a cavity of the first group of cavities.

14. The method according to claim 1, wherein each of steps a), b) and c) is performed while simultaneously forming a respective article in each cavity of the first group of cavities and the second group of cavities.

15. Method for controlling an injection molding system during formation of articles with a mold during a single production cycle, which starts with loading molten material into a passage of the mold and ends with opening the mold to eject the articles formed in the mold, wherein the mold having an inner surface and a plurality of groups of cavities that includes a first group of cavities and a second group of cavities, each group of cavities comprising at least one cavity confined by the inner surface, and each respective group of cavities further having a respective pressure sensor disposed at the inner surface in a region of a cavity of each respective group of cavities, and each respective group of cavities being at least partially surrounded by a respective tempering unit that includes a tempering medium that provides an energy flow to or from the respective at least partially surrounded group of cavities, the method being performed during the formation of the articles in the mold during the single production cycle and comprising the steps of:

a) determining an actual pressure in each of the first group of cavities and the second group of cavities during the formation of the articles in the mold, b) using the actual pressures in step a) in determining a reference pressure as a function of the actual pressures in step a) during the formation of the articles in the mold for each of the first group of cavities and the second group of cavities, wherein determining the reference pressure includes either averaging the pressures of each group of cavities or calculating the RMS value of the pressures of each group of cavities, c) determining a difference between the reference pressure and the actual pressure of the first group of cavities, and d) controlling the difference to become minimum that is essentially zero within the constraints of the accuracy of the respective pressure sensor, e) wherein step d) is performed by regulating the energy flow of the respective tempering unit.

* * * * *